(12) United States Patent
Witt

(10) Patent No.: US 6,228,433 B1
(45) Date of Patent: May 8, 2001

(54) ABRASION RESISTANT URETHANE COATINGS

(75) Inventor: Alvin E. Witt, West Chester, PA (US)

(73) Assignee: PermaGrain Products, Inc., Newtown Square, PA (US)

( * ) Notice: Subject to any disclaimer, the term of this patent is extended or adjusted under 35 U.S.C. 154(b) by 0 days.

(21) Appl. No.: 09/071,952

(22) Filed: May 4, 1998

Related U.S. Application Data

(60) Provisional application No. 60/045,516, filed on May 2, 1997, now abandoned.

(51) Int. Cl.$^7$ ................................ C08F 4/26; C08F 16/28
(52) U.S. Cl. ............................ 427/487; 427/508; 525/90; 525/97
(58) Field of Search ................... 524/86, 430; 522/13, 522/90, 97; 427/487, 508, 526; 428/425.1, 511, 514

(56) References Cited

U.S. PATENT DOCUMENTS

| | | | |
|---|---|---|---|
| 3,897,372 | 7/1975 | Kehr et al. | 521/122 |
| 4,059,551 | 11/1977 | Weiant et al. | 523/402 |
| 4,147,690 | 4/1979 | Rich | 524/436 |
| 4,216,130 | 8/1980 | Rigge et al. | 523/200 |
| 4,397,974 | 8/1983 | Goyert et al. | 524/143 |
| 4,426,488 | 1/1984 | Wyman | 524/783 |
| 4,457,766 * | 7/1984 | Caul | 51/298 |
| 4,622,360 | 11/1986 | Gomi et al. | 524/507 |
| 5,014,468 * | 5/1991 | Ravipati et al. | 51/295 |
| 5,077,330 | 12/1991 | Ehrhart et al. | 524/314 |
| 5,198,521 | 3/1993 | Ehrhart et al. | 528/48 |
| 5,306,739 | 4/1994 | Lucey | 522/42 |
| 5,331,044 | 7/1994 | Lausberg et al. | 524/871 |
| 5,418,271 | 5/1995 | Burba, III et al. | 524/436 |
| 5,500,480 | 3/1996 | Brown et al. | 524/437 |
| 5,521,247 | 5/1996 | Dobler et al. | 524/591 |
| 5,534,582 | 7/1996 | Krause et al. | 524/441 |
| 5,567,763 | 10/1996 | Madan et al. | 524/701 |
| 5,600,089 | 2/1997 | Reed et al. | 149/19.4 |
| 5,629,359 * | 5/1997 | Peeters et al. | 522/96 |
| 5,633,079 * | 5/1997 | Shoshi et al. | 428/323 |
| 5,725,960 * | 3/1998 | Konishi et al. | 428/451 |
| 5,763,048 * | 6/1998 | Takahashi | 428/147 |
| 5,928,778 * | 7/1999 | Takahashi et al. | 428/323 |

OTHER PUBLICATIONS

Aldrich, Catalog Handbook of Fine Chemicals, p. 843, 1994.*

* cited by examiner

Primary Examiner—Paul Thilbodeau
Assistant Examiner—D. Lawrence Tarazano
(74) Attorney, Agent, or Firm—Eugene E. Renz, Jr., PC

(57) ABSTRACT

A radiation curable and abrasion resistant coating composition is provided comprising: (a) 70% to 98% by weight of an urethane-acrylate oligomer; (b) 2% to 30% of fine particles of a filler capable of imparting abrasion resistance having an average particle size in the range of 1–20 microns; (c) optionally a reactive diluent; and (d) optionally an synthetic resin. The coatings when applied to wood floorings impart superior abrasion resistance.

5 Claims, No Drawings

ABRASION RESISTANT URETHANE COATINGS

This application claims the benefit of U.S. Provisional Application No. 60/045,516 filed May 2, 1997 now abandoned.

FIELD OF THE INVENTION

This invention relates to improved coatings which provide increased wear in commercial applications. This invention further relates to coating compositions and a coating system which forms a highly abrasion resistant, chemical resistant, impact resistant protective finish for a substrate. The present invention also relates to polyurethane coatings containing metal oxide fillers which are particularly useful for imparting abrasion resistance to wood floors. The instant invention also provides substrates coated with UV curable acrylated urethane coatings containing fillers which impart abrasion resistance to said substrates.

BACKGROUND OF THE INVENTION

DESCRIPTION OF THE PRIOR ART

Polyurethane compositions have been proposed for and used for coating hardwood floors for many years. In the flooring as earlier used, a coating of moisture curing polyurethane (about 40% solids) in a solvent such as xylene or other solvent, was applied to the substrate to saturate it and provide adhesion. After the first coat had at least partially cured, a second coat was applied, and while the second coat was still wet, chips of colored dry paint were scattered over and pressed through the surface. When this layer had dried, the chips which had not adhered were swept away, the surface sanded and vacuumed, and another coat of clear urethane glaze was applied thereover. While that coat was still wet, chips were again scattered over the surface, pressed therein, and when the coating had hardened, the floor was again swept and vacuumed, and a further clear coat of urethane glaze (40% solids) applied. As soon as that coating had hardened, many more coats of 40% solids urethane glaze were applied thereover, each one after the former had hardened.

The flooring as thus produced had these drawbacks: The first coat did not adhere satisfactorily. It was a 40% urethane glaze in hydrocarbon solvent and thus dissolved hydrocarbon soluble stains which were invariably present on the floor, and these stains migrated through to the top of the flooring. Furthermore, the urethane composition invariably turned brown after prolonged exposure to ultraviolet light. Finally the many coats required a great deal of labor, could not be applied in a single day, and the large quantities of solvent such as xylene caused considerable toxicity and odor.

Consequently, the industry evolved the following system:

1. A sealer coat was applied to keep out stains, give adhesion to any substrate, and bond to the next coat. This was either a 100%-solids epoxy or an epoxy emulsion.

2. A chip coat was developed to hold the chips, bridge cracks in the floor, and bond to the next coat. Ordinarily this was the same as the sealer coat.

3. A chip-binding coat or intermediate coat was applied to bind the very hydrophilic chips to each other and to harden them up enough so that they could be sanded. In most cases one or more coats of a polyurethane glaze was used for this purpose, but in some instances a polymeric latex or a clear epoxy emulsion was used.

4. Finally, glaze coats of curing polyurethane in solvent were applied to provide the wearing surface and to give abrasion resistance, stain resistance, and leveling. For each of the coats, an obvious requirement is rapid cure. Without it the job would take too long to be practical.

While the multi-layer system thus proposed is much superior to the original system, it still has many problems. When the epoxy emulsion or 100% solids epoxy is used for both sealer and chip coats, it becomes brittle, shrinks and cracks. This is permissible in a sealer coat, but not a chip coat, which must bridge cracks. In addition, the cure rate of the epoxies is very temperature dependent. Being two package materials, a material with a reasonably long pot life has an inordinately long cure time on a cold floor. Another problem peculiar to the epoxies, when used in urethane systems, is "purpling". The cause is not well understood, but in a significant number of cases the interface between the epoxy and an unpigmented urethane develops an unsightly purple color.

While the currently available base and chip coats present problems, they are more satisfactory than the currently available glazes which have the following faults:

A. The very high xylene content is unsatisfactory for two reasons—the large amount of xylene is unpleasant and dangerous, and the solids content of the glaze is so low that several coats must be applied leading to high labor costs.

B. The glaze yellows badly because of the aromatic isocyanates used. Ultraviolet absorbers effectively halt yellowing only temporarily—a few months to a year—before the film yellows as much as if the absorber were not there.

C. The film formed from the glaze abrades rather quickly.

The obvious solution to the high xylene content, to use less, did not work: Bubbles formed, which eventually broke and collected dirt. Apparently, reducing the xylene content permitted the surface skin to form. This stopped outward diffusion of carbon dioxide which, being entrapped, formed bubbles.

A solution to the yellowing problem is the use of the non-yellowing aliphatic isocyanates used to make polyurethanes. All of these have certain disadvantages. For example, hexamethylene diisocyanate is extremely expensive, is highly toxic, and rather slow to cure. Hydrogenated MDI (HMDI) has two isocyanate groups with equal reactivity. Consequently, it forms highly viscous prepolymers which have a high percentage of free HMDI, which is extremely allergenic via skin absorption.

Isophorone diisocyanate, IPDI, seems to be the best isocyanate available. It is the lowest-priced aliphatic diisocyanate. Its two isocyanate groups are of unequal reactivity so that it gives lower-viscosity prepolymers containing less free monomer vis-a-vis HMDI. However, IPDI has serious drawbacks: although less toxic than HMDI or hexamethylene diisocyanate, it can still cause serious harm via skin absorption. Clear films from IPDI prepolymers degrade to liquid in strong sunlight. Prepolymers formed from the more reactive aliphatic isocyanate group of IPDI are terminated by the less-reactive cycloaliphatic isocyanate groups which moisture cures slowly.

The abrasion resistance problem is probably the most serious. Abrasion resistance is the property which is sought by the purchaser of a floor. None of the solutions mentioned above helped to improve this property. The aliphatic isocyanates, rather than helping improve abrasion resistance, made it worse.

Floor surfaces, particularly those in public buildings, require not only abrasion resistance, but resistance to contamination or staining caused by tar or asphalt brought in by foot traffic from road or parking lot surface. To be a successful floor coating composition, the resulting coating must adhere strongly to the base, must dry or cure bubble free, must produce in a single application a heavy coating that is highly resistant to both abrasion and asphalt staining.

Coating compositions have been developed which, when applied to a substrate and cured, impart a highly abrasion resistant surface to the substrate. Coating compositions of this type have been widely used to impart abrasion resistance to plastic lenses such as eyeglass lenses, to plastic panels and films, to wood surfaces such as furniture, and many other applications where an abrasion resistant or scratch resistant surface finish is of importance.

Abrasion resistant coatings of this type are typically based upon acrylate monomers which are cured or cross-linked after application of the coating, typically by radiation curing. Radiation curable coatings offer the advantage of being rapidly cured and polymerized without requiring curing ovens and they can be applied and processed without having to remove solvents and deal with solvent vapors in the workplace environment.

It is known that radiation cured acrylate polymers can produce very hard (glass hard) protective coatings which exhibit superior abrasion and chemical resistance properties. Although the coatings are quite hard and resistant to abrasion and scratching, they are brittle and have a tendency to crack and peel from the substrate, especially when applied to relatively flexible substrates or when subjected to impact.

Prior abrasion resistant coatings have sought to deal with the brittleness and cracking problem by using a softening comonomer (a monomer with a low second order transition temperature) to impart some degree of flexibility to the coating. However, in achieving increased flexibility and reduced brittleness, the abrasion resistance of the coating is sacrificed. Thus, for example, U.S. Pat. No. 4,319,811 describes an abrasion resistant radiation curable coating based upon tri- and tetra acrylate monomers, such as pentaerythritol triacrylate with a comonomer such as vinyl pyrrolidone or vinyl caprolactam. U.S. Pat. No. 4,308,119 teaches an abrasion resistant radiation curable coating composition comprised of a pentaerythritol tetra acrylate with a cellulose ester such as cellulose acetate butyrate. U.S. Pat. No. 4,557,980 discloses a radiation curable coating composition based upon a mixture of a triacrylate or tetra acrylate, such as pentaerythritol tetra acrylate, with acrylic acid.

The resistance of a coating to scratching abrasion is typically measured by the rotary steel wool test, which involves subjecting the coating to five revolutions of a pad of 0000 grade steel wool at a defined pressure, usually 12 or 24 psi. The scratching abrasion resistance is rated by measuring the increase in haze from the abrasion. Test methods such as ASTM D-1044 have been developed for optically measuring the resistance of transparent plastic materials to abrasion. Other standard tests for abrasion resistance are the Taber abrasion test described in ASTM D-1004-56.

In many applications, the protective finish needs not only to be "hard" and thus resistant to scratching, but also must have excellent toughness and resistance to impact. The toughness or impact abrasion resistance of a coating is commonly measured by the "falling sand" test (ASTM D968-51). A coating which has good scratch abrasion resistance may not necessarily have good impact abrasion resistance. With the falling sand test, sand is poured onto a coating from a predetermined height, while the thickness of the coating is observed. The results are expressed in terms of the number of liters of sand required to abrade away one tenth of a mil of the coating thickness. The radiation cured abrasion resistance coatings noted in the aforementioned prior patents have a relatively poor resistance to impact abrasion which renders these types of coatings unacceptable for applications requiring both good resistance to scratching abrasion an good resistance to impact abrasion.

The prior art is silent regarding coatings which incorporate a filler having a particle size in the range of 1–20 microns capable of imparting abrasion resistance to a coated substrate.

SUMMARY OF THE INVENTION

With the foregoing in mind, it is an important object of the present invention to provide a coating system which provides good resistance to scratching abrasion and resistance to impact abrasion.

It is another object of the present invention to provide a polyurethane-base coating composition of high solids content that may be applied over a suitably prepared base to provide a glaze layer of high wear resistance that resists staining to a much greater extent than coatings previously proposed.

A further object of the present invention to provide a polyurethane-base coating system that may be applied to suitably prepared vinyl tile, vinyl asbestos tile, wood, and the like that will provide a clear, highly abrasion resistant coating which will not require expensive stripping and waxing.

It is a further object of the present invention to provide relatively low cost polyurethane-base coating composition of high solids content containing a filler having a particle size in the range of 1–20 microns.

It is still an object of the invention to provide UV curable coating compositions having good abrasion resistance.

It is another object of the invention to provide UV curable polyurethane coating compositions having fillers that impart good abrasion resistance.

It is an additional object of the invention to provide wood floors having good abrasion resistance using the UV curable polyurethane coatings of the present invention.

It is yet another object of the invention to provide articles of manufacture having good abrasion resistance by incorporating the coating compositions of the present invention.

It is still a further object of the invention to provide UV curable polyurethane coating compositions having fillers that impart good abrasion resistance wherein said fillers have a particle size in the range of 1–20 microns.

Briefly, the present invention relates to a coating composition comprising: (a) a synthetic resin; and (b) fine particles of a filler capable of imparting abrasion resistance having an average particle size in the range of 1–20 microns.

The present invention is also directed to a radiation curable coating composition comprising: (a) an oligomer of the formula

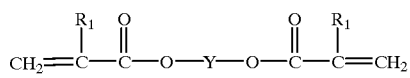

wherein $R_1$ is hydrogen or methyl; and Y is a divalent urethane residue; and (b) fine particles of a filler capable of imparting abrasion resistance having an average particle size in the range of 1–20 microns.

The invention is further directed to a radiation curable coating composition comprising: A radiation curable coating composition comprising:

(a) 70% to 98% by weight of an oligomer of the formula

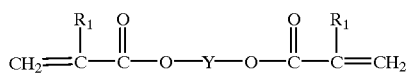

wherein $R_1$ is hydrogen or methyl; and Y is a divalent urethane residue;
(b) 2% to 30% of fine particles of a filler capable of imparting abrasion resistance having an average particle size in the range of 1–20 microns;
(c) optionally a reactive diluent; and
(d) optionally an synthetic resin.

The instant invention also relates to substrates such as wood, plastics, and the like coated with a radiation curable coating composition comprising:

(a) 70% to 98% by weight of an oligomer of the formula

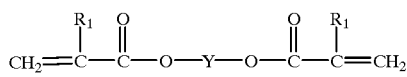

wherein $R_1$ is hydrogen or methyl; and Y is a divalent urethane residue; and
(b) 2% to 30% of fine particles of a filler capable of imparting abrasion resistance having an average particle size in the range of 1–20 microns.

The present invention is also directed to an article of manufacture comprising a substrate coated with a UV curable composition comprising: (a) an oligomer of the formula

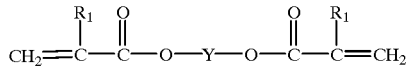

wherein $R_1$ is hydrogen or methyl; and Y is a divalent urethane residue; and (b) fine particles of a filler capable of imparting abrasion resistance having an average particle size in the range of 1–5 microns.

The invention also features a method for imparting abrasion resistance to wood floors by applying to said floors a UV curable composition containing a urethane-acrylate and a filler having a particle size in the range of 1–20 microns.

DETAILED DESCRIPTION OF THE PREFERRED EMBODIMENTS

The objects of the present invention and many of the expected advantages of the present invention will be readily appreciated as the same becomes better understood by reference to the following detailed description.

The novel coating compositions of the present invention contain two basic components. The first component is a resinous component which is typically a synthetic resin or mixtures of synthetic resins or an oligomeric component which is further polymerized into a resin. The second component is a filler which imparts abrasion resistance to the resulting coating once is applied to a surface and cured.

The resins of the present invention are typically synthetic resins capable of forming a film upon curing. In some cases, a resin precursor such as an oligomer may be used which is then cured by UV radiation or other wave energy means.

Polyurethane oligomers or resins having terminal acrylyl or methacrylyl groups are useful in the practice of the present invention. These are generally produced by the reaction of one or more organic polyisocyanates with one or more organic polyols, wherein at least a portion of the polyisocyanate or polyol reactant has, in addition to its isocyanate or hydroxyl functionality, acrylyl or methacrylyl groups. The prior art discloses acrylate or methacrylate capped polyurethanes wherein the organic polyol used in their production is a polyester polyol. For example, U.S. Pat. No. 3,700,643 discloses a number of acrylate capped polyurethanes based on polycaprolactone polyols. The prior art also discloses acrylate or methacrylate capped polyurethanes based on polyether polyols (see, e.g. U.S. Pat. Nos. 3,782,961 and 3,955,584). A particularly preferred acrylate-urethane oligomer is Raycron UV400 sold by PPG Industries, Inc.

It is desirable that the acrylate or methacrylate capped polyurethane employed in the radiation curable coating composition have a sufficiently low viscosity that the coating compositions based thereon are easily applied to a substrate using conventional coating techniques without the excessive use of diluents. Although low molecular weight acrylate or methacrylate monomers, such as 2-ethylhexyl acrylate, 2-hydroxyethyl acrylate, N-vinyl pyrrolidone etc., can be used as reactive diluents in conjunction with the oligomer or resin, it is desirable to use as little of these monomers as possible, since these monomers are somewhat toxic and special care must be taken to avoid skin contact with them.

Useful oligomers that can be used in the present invention include acrylate or methacrylate capped polyurethanes based on polyether polyols which exhibit desirable low viscosity. Also, acrylate or methacrylate capped polyurethanes based on polyester polyols may be used but they have relatively high viscosities so that undesirably high amounts of the aforementioned diluents must be used in order to achieve the desired application viscosity.

The preferred coatings of the invention are based on an oligomer of the formula I

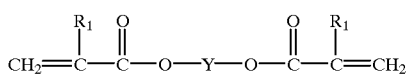

wherein $R_1$ is hydrogen or methyl; and Y is a divalent urethane residue. Preferably a vinyl monomer such N-vinylpyrrolidone or other monomers having ethylenic unsaturation are included which are copolymerizable with the oligomer. Oligomers of the above formula with an acrylic or methacrylic component are well known in the art. Oligomers of this type are shown in U.S. Pat. Nos. 3,907,574; 3,874,906; 3,989,609; and 3,895,171. A preferred type of oligomer contains both an acrylic component and a urethane portion in the Y radical. Examples of these compounds are found in U.S. Pat. Nos. 3,912,516; 3,891,523; 3,864,133; and 3,850,770.

Preferred novel types of acryl urethane are shown by Formulas II and III:

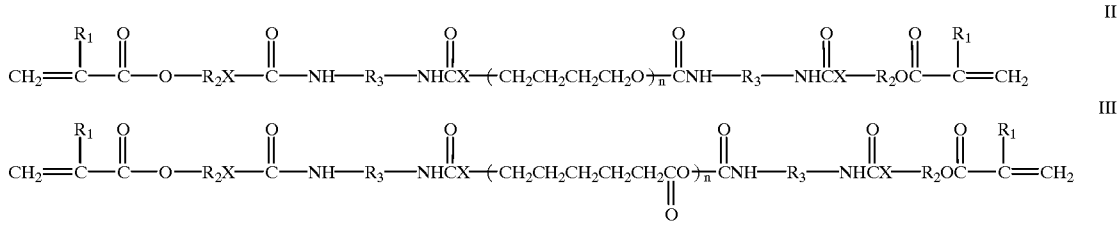

wherein $R_1$ hydrogen or methyl; $R_2$ is lower alkylene; $R_3$ is aliphatic or cycloaliphatic; X is —O— or —NH—; n is an integer from 2 to 50 inclusive.

These oligomers are produced by reacting polytetrahydrofuran, polycaprolactone polyols and other polyols with a diisocyanate to produce an isocyanate terminated prepolymer. The isocyanate terminated prepolymer is then capped with a capping agent to produce the oligomer of Formula II and Formula III.

The preferred oligomers of Formula II are those of the Formula V

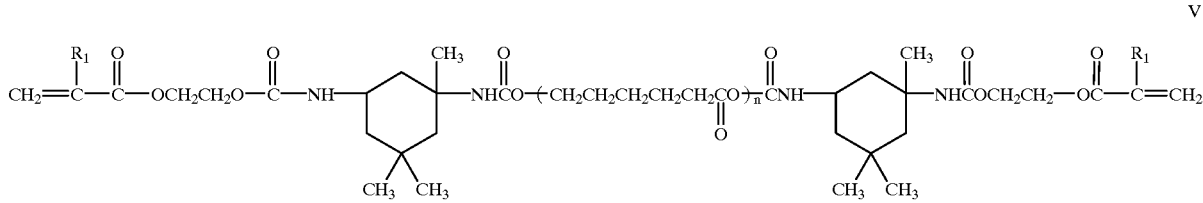

and the preferred oligomers of Formula III are those of Formula VI

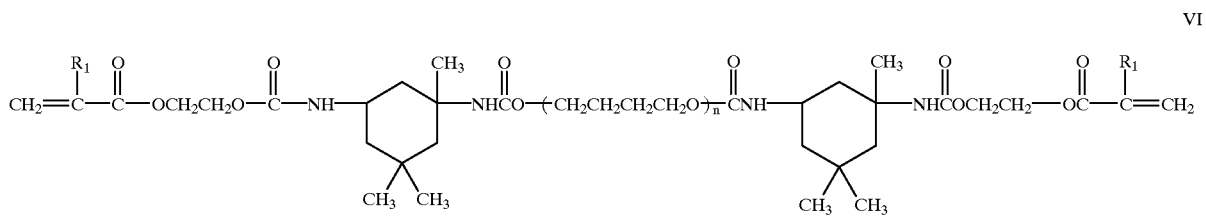

wherein "n" is an integer from 5 to 20 inclusive.

The polytetrahydrofuran is commercially available from the Du Pont Company under the tradenames "TERRECOL-650", "TERRECOL-1000", and "TERRECOL-2000", and from the Quaker Oats Company under the tradenames "POLYMEG-650", "POLYMEG-1000", and "POLYMEG-2000". In the above tradenames the number indicates the approximate molecular weight of the polytetrahydrofuran. The most preferred polytetrahydrofuran is that having a molecular weight of 650 which is consistent with the definition of "n" in Formulas II and V herein. At higher molecular weights wherein "n" exceeds about 50 the resultant oligomer has too high a viscosity.

The caprolactone polyols are commercially available from Union Carbide Corp. under the tradenames "NIAX CAPROLACTONE POLYOLS"—PCP-0200, PCP-0210, PCP-0230, PCP-0240, PCP-0300, PCP-0301 and PCP-0310. The 0200 series are diols with molecular weights 530, 830, 1250 and 2000 respectively. The 0300 series are triols with molecular weights 540, 300 and 900 respectively.

The oligomers of Formula II, III, V, and VI can be produced in accordance with U.S. Pat. No. 4,129,709. The capping agents useful in the present invention are those that will react with the isocyanate terminated prepolymer to produce the oligomers of Formula II. In general, any capping agent having a terminal amine or hydroxyl group and also having an acrylic acid or methacrylic acid moiety is suitable. Examples of suitable capping agents include among others hydroxyethyl acrylate, hydroxyethyl methacrylate, hydroxypropyl acrylate, hydroxypropyl methacrylate, hydroxybutyl acrylate, hydroxybutyl methacrylate, hydroxypentyl acrylate, hydroxypentyl methacrylate, hydroxyhexyl acrylate, hydroxyhexyl methacrylate, aminoethyl acrylate, and aminoethyl methacrylate.

The diisocyanates useful to produce oligomers of Formula II are aliphatic and cycloaliphatic diisocyanates that will react with terminal hydroxyl groups present on the polytetrahydrofuran. Of course, aromatic diisocyanates undergo the same reaction but do not yield a product as satisfactory as that obtained by the use of aliphatic diisocyanates. Examples of suitable diisocyanates include among others, isophorone diisocyanate, 4,4'-dicyclohexylmethane-diisocyanate available commercially from the Du Pont Company under the trade name "Hylene W", and trimethyl-hexamethylene-diisocyanate, 1,6 hexamethylene diisocyanate, 2,4,4 trimethyl 1,6 hexylene diisocyanate, octadecylene diisocyanate and 1,4 cyclohexylene diisocyanate. The preferred diisocyanates are isophorone diisocyanate (3-isocyanatomethyl 3,5,5 trimethyl cyclohexyl isocyanate) and 4,4' dicyclohexylmethane-diisocyanate.

The vinyl monomer copolymerizable with the oligomer may be one or more monomers compatible with the oligomer selected. N-vinyl-2 pyrrolidone and acrylic acid esters having a boiling point of at least 200° C. at 760 mm Hg are preferred. These monomers allow adjustment of the viscosity for ease of coating operations and N-vinyl-2-pyrrolidones also enhance the rate of curing. The weight ratio of oligomer to N-vinyl-2-pyrrolidone can vary widely as long as the properties of the resultant cured coating composition are not adversely affected, however, they are generally present in a weight ratio of 1:9 to 9:1 and preferably 1:3 and 3:1. At higher ratios, e.g., those rich in oligomer, the uncured coating composition tends to have too high a viscosity. This high viscosity makes it difficult to apply the uncured coating composition to the substrate. At lower ratios the resultant cured coating composition tends to be too hard and inflexible.

The above oligomers can be further combined with others resins such as acrylic resins, vinyl resins, melamine and acrylated melamine resins, polyester resins, alkyd resins, epoxy resins, cellulose resins, amino resins and silicone resins.

Many different types of vinyl resins may be used when blended with the acrylated urethane oligomer. Carboxyl modified vinyl chloride/vinyl acetate copolymers are particularly useful because they show excellent adhesion to various substrates such as metals, cellulosics and plastics. The preferred vinyl resins are terpolymers containing approxiamtely 80–86% vinyl chloride, 13–19% vinyl acetate and 1–2% maleic acid. The resins are usually dissolved in relatively strong solvent/diluent combinations, such as 50% ketone/50% aromatic hydrocarbon, to produce solutions of 20 to 22% solids. Also the epoxy modifed versions of the above terpolymers may be used in the practice of the present invention. The vinyl resins used in the coatings of the present invention are sold by Union Carbide. Resisn under the trade designation of VMCH, VMCC, VMCA and VERR-40. VMCH is a high molecular weight resin containing approxiamtely 86% vinyl chloride, 13% vinyl acetate and 1% maleic acid. VMCH is usually dissolved in relatively strong solvent/diluent combinations, such as 50% ketone/50% aromatic hydrocarbon, to produce solutions of 20 to 22% solids. VMCC is a medium molecular weight resin containing approximately 83% vinyl chloride, 16% vinyl acetate, and 1% maleic acid. Vinyl VMCC is more soluble than VMCH in ketones, esters, and other solvents used to dissolve vinyl resins. VMCC also has a higher tolerance for aromatic hyrocarbon diluents. When dissolved in a suitable solvent system, such as a 50% ketone/50% aromatic hydrocarbon, resin solutions of 23 to 25% solids can be achieved. VMCA is a low molecular weight resin containing approximately 81% vinyl chloride, 17% vinyl acetate and 2% maleic acid. Vinyl VMCA is characterized by a high degree of solubility in solvent systems having a high aromatic hyrocarbo content. When dissolved in a suitable solvent/diluent combination, such as 25% ketone/75% aromatic hyrocarbon, resin solutions of 30% solids can be achieved. VMCA yields good balance of solubility and viscosity properties needed for high-build, air-dry maintenance finishes. VERR-40 is a low molecular weight epoxy-modified Vinyl Chloride/Vinyl Acetate Copolymer copolymer available as a solution at 40% solids in MEK/toluene (3/2 by weight). VERR-40 can be blended with carboxyl-modified vinyls (VMCH, VMCC, and VMCA) to provide an all-vinyl reactive coating system that, when cured by baking, yields coatings with enhanced toughness, flexibility, and solvent resistance.

Another type of resins which can be blended with the acrylated urethane oligomer are those derived from the condensation of melamine with formaldehyde which have further etherified. A particular useful melamine resin is CYMEL 1100. The series of CYMEL 1100 resins of mixed ether and butylated resins are highly alkylated melamine-formaldehyde resins whose properties are modified due to the nature of their alkylating alcohols.

Other suitable CYMEL resins include CYMEL 300, 301, 303, 303LF and 350. This series of melamine resins are four grades of hexamethoxymethyl-melamine (HMMM) marketed by Cytec. They differ primarily in their degree of alkylation and monomer content. The HMMM resins are efficient crosslinking agents for hydroxyl, carboxyl and amide functional polymers. CYMEL 300 resins in the most highly alkylated and most monomeric grade. In its most normal state, CYMEL 3000 resin is a waxy solid with a melting point of 30°–35° C. CYMEL 300 provides exceptionally fast cure response on low bake schedules in highly catalyzed systems. This suggests its use in paper coatings and catalyzed wood finishes. CYMEL 300 resin also has outstanding stability in water-borne systems that are pH buffered on the alkaline side. CYMEL 301 resin has a slightly lower degree of alkylation than CYMEL 300 resin and is liquid under normal conditions. It is more water soluble due to its higher free methylol content and is preferred in some emulsion because of its ease of incorporation. CYMEL 303 resin is a liquid grade of HMMM and is the most versatile and economical melamine crosslinking agent available. Unline CYMEL 301 resin, CYMEL 303 has a very low free methylol content. As a result, CYMEL 303 resin provides excellent stability in water-borne systems. CYMEL 303 resin provides better catalyzed stability in organo-soluble systems than less highly alkylated melamine resins. CYMEL 350 resin is a very unusual crosslinking agent in that its composition is very similar to the series of CYMEL 370 melamine resins except that it is more monomeric. Its performance properties approach those of CYMEL 303 resin. CYMEL 350, like CYMEL 303 resin, responds best to strong acid catalysis. It is completely water soluble and finds wide application as a crosslinking agent for emulsion systems. CYMEL 350 resin provides very fast cure response on high temperature cure schedules.

An additional material that can be blended with the urethane acrylate is Santolink AM129 (Monsanto Co.) which is is a reactive solution of acrylated melamine resin in tripropylene glycol diacrylate. Santolink AM 129 imparts a high degree of hardness and gloss, as well as stain and chemical resistance, to the coating. Santolink AM 129 can be cured by free radical polymerization initiated by UV or thermal processing. The ether functionality on this crosslinker may also undergo thermally induced condensation reactions allowing it to be copolymerized with polyols.

The cellulosic resins that can be blended with the urethane-(meth)acrylate component is typically selected from the group consisting of a cellulosic ester, a cellulosic ether, a cellulosic ether ester and mixtures thereof. The preferred material is a cellulose acetate butyrate sold by Eastman under the tradename designation of CAB-551-0.01 which has an average butyryl content of 53% by weight, 2% acetyl content by weight and hysroxyl content of 1.5% by weight.

The coating compositions of this invention optionally contain zero to about five percent by weight of an energy-activatable source of free radicals, i.e., a free-radical polymerization initiator which generates or liberates free radicals upon addition to the compositions of energy such as thermal energy, actinic radiation, or electron beam radiation. Curing techniques such as thermal energy and actinic radiation ordinarily require the use of positive amounts (i.e., more than zero percent by weight) of polymerization initiator. No polymerization initiator (i.e., zero percent by weight) is ordinarily required when curing techniques such as electron beam energy are used. Useful free-radical polymerization initiators are further described, for example, in Chapter II of "Photochemistry" by Calvert and Pitts, John Wiley & Sons (1966).

Thermally-activated free-radical polymerization initiators include organic peroxides, organic hydroperoxides, and other known initiators, such as benzoyl peroxide, tertiary-butyl perbenzoate, cumene hydroperoxide, isopropyl peroxydicarbonate, azobis(isobutyronitrile), and the like. The preferred free-radical polymerization initiators for use in this invention are photopolymerization initiators which release free-radicals when the compositions of this invention are irradiated with suitable electromagnetic radiation.

Useful photopolymerization initiators include acyloin and derivatives thereof such as methyl benzoyl formate, benzoin, benzoin methyl ether, benzoin ethyl ether, benzoin isopropyl ether, benzoin isobutyl ether, and alpha-methylbenzoin, diketones such as benzil and diacetyl, organic sulfides such as diphenyl monosulfide, diphenyl disulfide, decyl phenyl sulfide, and tetramethylthiuram monosulfide, S-acyl dithiocarbamates such as S-benzoyl-N,N-dimethyldithiocarbamate, phenones such as acetophenone, alpha,alpha,alpha-tribromoacetophenone, alpha, alpha-diethoxyacetophenone, ortho-nitro-alpha, alpha,alpha-tribromoacetophenone, benzophenone, and 4,4'-bis (dimethylamino)benzophenone, and sulfonyl halides such as p-toluenesulfonyl chloride, 1-naphthalenesulfonyl chloride, 2-naphthalenesulfonyl chloride, 1,3-benzenedisulfonyl chloride, 2,4-dinitrobenzenesulfonyl bromide and p-acetamidobenzenesulfonyl chloride. Methyl benzoyl formate is a preferred photopolymerization initiator, as it provides products having low yellow color.

For curing techniques such as thermal energy and actinic radiation, the free-radical polymerization initiator is ordinarily used in amounts ranging from about 0.01 to 5 percent by weight compared to the total weight of the coating composition. When the polymerization initiator quantity is less than about 0.01 percent by weight, the polymerization rate of the composition is slowed. When the polymerization initiator is used in amounts greater than about five percent by weight, no appreciable increase in polymerization rate is observed compared to compositions containing about five percent by weight of polymerization initiator. Preferably, about 0.05 to 1.0 percent by weight of polymerization initiator is used in the polymerizable coating compositions of this invention cured by thermal energy or actinic radiation.

Preferred photoinitiation energy sources emit actinic radiation, i.e., radiation having a wavelength of 700 nanometers or less which is capable of producing, either directly or indirectly, free radicals capable of initiating addition polymerization of the coating compositions of this invention. Particularly preferred photoinitiation energy sources emit ultraviolet radiation, i.e., radiation having a wavelength between about 180 and 460 nanometers, including photo-initiation energy sources such as mercury arc lights, carbon arc lights, low, medium, or high pressure mercury vapor lamps, swirl-flow plasma arc lamps, ultraviolet light emitting diodes, and ultraviolet light emitting lasers. Particularly preferred ultraviolet light sources are "black lights" and medium or high pressure mercury vapor lamps, such as Models 60-2032, 60-0393, 60-0197 and 50-2031 (commercially available from PPG Industries, Inc.), and Models 6512A431, 6542A431, 6565A431, and 6577A431 (commercially available from Hanovia, Inc.).

Ionizing radiation can also be used to cure the coating compositions of this invention. Ionizing radiation is radiation possessing an energy at least sufficient to produce ions either directly or indirectly and includes ionizing particle radiation and ionizing electromagnetic radiation. Ionizing particle radiation designates the emission of electrons (i.e., "E-beam" radiation) or accelerated nuclear particles such as protons, alpha particles, deuterons, beta particles, neutrons or their analogs. Charged particles can be accelerated using such devices as resonance chamber accelerators, DC potential gradient accelerators, betatrons, synchrotrons, cyclotrons, and the like. Uncharged particles (i.e., neutrons) can be produced by bombarding a selected light metal such as beryllium with positive particles of high energy. Ionizing particle radiation can also be obtained by the use of an atomic pile, radioactive isotopes or other natural or synthetic radioactive materials. Ionizing electromagnetic radiation transmits high energy photons by means such as X-rays and gamma rays.

If desired, the radiation curable coating composition can contain a reactive crosslinking agent. The suitable crosslinking agents are known to those skilled in the art and preferably are chosen from the low molecular weight polyfunctional acrylate or methacrylate esters having molecular weights below about 1,200, preferably below about 600.

The low molecular weight polyfunctional acrylate or methacrylate esters are any of the di-, tri-, or tetraacrylate esters of acrylic acid or methacrylic acid with the di-, tri-, or tetra-alcohols. One can mention, as being merely illustrative thereof, neopentyl glycol diacrylate, 3'-acryloxy-2',2'-dimethylpropyl 3-acryloxy-2,2-dimethylpropionate, 1,6-hexanediol diacrylate, pentaerythritol triacrylate, ethylene glycol diacrylate, diethylene glycol diacrylate, trimethylol propane triacrylate, pentaerythritol tetraacrylate, and the like, the reaction product of 2 moles of a hydroxyalkyl acrylate, e.g. 2-hydroxyethyl acrylate, and 1 mole of an organic diisocyanate, or the corresponding methacrylates.

The filler of the invention capable of imparting abrasion resistance is typically a solid material having a particle size in the range of about 1–20 microns and more prefereably in the range of 1–5 microns. The solid material may be organic or inorganic. Typical organic materials that can be used include diamond particles, polytetrafluoroethylene and polyethylene and mixtures thereof. The inorganic material capable of imparting abrasion resistance is typically a metal oxide of aluminum, magnesium or silicon or mixtures thereof with the preferred material being aluminum trihydrate having a particle size in the range of 3–5 microns. Other materials which are suitable include metal particles, metal carbides, refractory oxides of zirconium, ytrium.

The metal oxide filler such as aluminum trihydrate (ATH) which imparts abrasion resistance to the coatings of the present invention may also be surface modified to impart further improved properties to the resulting coating of the present invention. The surface modifications are particularly useful to aid processing or to improve physical, electrical, flame or chemical resistant properties. Selected surface modifications can aid in rapid and complete ATH dispersion by increasing the compatibility of the ATH for the polymer matrix. This effect can be observed in both liquid and solid polymers. With increased compatibility, a significant reduction in polymer viscosity can result in improved processability or increased loading levels of ATH, while maintaining acceptable processability. Surface modification can be accomplished by treating the ATH with surfactants such as nonionics, anionics and cationics. Surface modification can also be accomplished by treating with a metal stearate suh as magnesium stearate. The surface modification can also be made by chemical coupling such as with organofunctional silanes such as the aminoalkyl trialkoxysilanes which can result in improvements in certain physical properties by increasing interfacial adhesion between the ATH and polymer matrix. Also specific improvements in physical properties can include: enhanced mechnical properties such as tensile, flexural, impact or elongation improvements can be achieved. Also, Increased resistance to water permeation may be observed with certain surface modifications. The preferred alumina trihydrate used in the coating compositions of the present invention are purchased from J. M. Huber and sold under the tradenames of SOLEM®, MICRAL® and HYMOD®. A particulalrly preferred ATH is one having an avrage particle size in the range of 1–5 microns.

Another filler additive that can be used to improve the abrasion resistance of the coatings of the present invention is a product known as Super Taber 5509 which is a blend of polytetrafluoroethylene and polyethylene and sold by Shamrock Technologies, Inc. The product is sold under two grades, SPS (average particle size—18 microns) and NI (average particle size—5 microns). SuperTaber 5509 is a combination of P117E and a range of polyethylenes. The SuperTaber improves the surface slip of coatings. SuperTaber 5509 can be easily incorporated into coatings by simple stirring. The use of speed mixing and dispersion equipment will not adversely affect the intercoat adhesion and physical characteristics of the coating. The content of SuperTaber in the formulation is typically 1–3% based on total formula weight.

The coatings of the present invention can be applied by conventional means, including spraying, curtain coating, dip padding, roll coating and brushing procedures. The coatings can be applied to any acceptable substrate, such as wood, metal, glass, fabric, paper, fiber, plastic, etc.

The abrasion resistant coatings of the present invention are best used as coatings upon a substrate i.e, wood substrates. Materials which are able to provide useful functions but do not have satisfactory abrasion resistance can be improved by the addition of coatings according to the present invention. Especially those materials which heretofore have not been coated to improve their resistance with any great success because of heat sensitivity (low melting point, destruction of heat unstable materials, etc.) can be readily improved according to the present invention because of the ability of the present composition to bond with essentially room temperature curing.

Solid substrates that can be coated are the surfaces of fibers, sheets, and shaped solid objects. Among the solid substrates particularly useful according to the present invention are ceramic materials (e.g., glass, fused ceramic sheeting and fibers), metals (e.g. sheets, fibers, aluminum, iron, silver, chromium and other metals), metal oxides, thermoplastic resins (e.g. polyesters, polyamides, polyolefins, polycarbonates, acrylic resins, polyvinyl chloride, cellulose acetate butyrate etc.), thermoset resins (e.g., epoxy resins, polysilanes, polysiloxanes, etc.) paper, wood, natural resins (e.g. rubber, gelatin), and, in general, any solid surface which needs protection from abrasion.

Where the substrate is not naturally adherent with the compositions of the present invention, primers may be used on the substrate. Many primers are known in the art, and their purpose is to provide a layer to which the coating more readily adheres than to the original surface of the substrate. For example, in the photographic art, primers are generally used on the polyethyleneterephthalate base to improve adhesion of subsequent layers thereto. Such primers, and other known primers, would be useful in the practice of the present invention. The surface of the substrate may itself be treated to improve adherence such as by abrasion or corona discharge to enhance bonding of the abrasion resistant layer thereto.

A large number of primers can find utility in the practice of this invention and do not affect the proportion of the top abrasion resistant coating. Some of the most useful ones, however, are the acrylic based primers such as terpolymers of butylmethacrylate, methyl methacrylate, and methacryloxy propyltrimethoxy silane, dissolved in appropriate solvents. The ratio of the components of the terpolymer can be varied over a wide range to attain the optimum primary properties for a given substrate. This primer when used in appropriate solvents such as isopropyl acetate, isopropanol, toluene-methanol mixtures or other mixed solvents find utility in priming a variety of substrates; such as polycarbonates, polymethylmethacrylates, cellulose acetate butyrate, polystyrene, aluminum, polyvinylchloride, silver halide—gelatin emulsions and a host of other organic and inorganic substrates. As far as the polyester is concerned, titania, silica, or polyvinylidene chloride are the best primers. A host of other commercial primers such as various aliphatic or aromatic urethanes, caprolactones, epoxies, and siloxanes can also find utility as primers for the coatings of the invention.

EXAMPLES

The following examples are set forth for the purpose of illustrating the invention in more detail. The examples are intended to be illustrative and should not be construed as limiting the invention in any way. Persons skilled in the applicable arts will appreciate from these examples that this invention can be embodied in many different forms other than as is specifically disclosed. All parts, ratios, percentage, etc. in the examples and the rest of the specification, are by weight unless otherwise noted.

The chemicals and their ratio are listed as shown in the following examples:

Example 1

Commercially available products were tested using ASTM D-1044 and Table I lists the results of the test.

TABLE 1

| PRODUCT | WT LOSS $10^{-5}$ grams/cycle |
| --- | --- |
| FineWood* | 4.4 |
| Home Center Available - Hickory | 4.3 |
| Home Center Available - Oak | 3.7 |
| Home Center Available - Maple | 4.3 |
| Sealed Acrylic Impregnanted | 7.3 |
| 5-Ply Oak | 6.0 |

*Trademark of Permagrain Products, Inc. It is not too surprising that home center material and FineWood are similar.

Example 2

Using a beaker and vigorous magnetic (or other type of agitation) stirring, 89.89 grams of cellulose acetate butyrate (Eastman CAB-551-0.01) containing 53% by weight butyryl content, 2% by weight acetyl and 1.5% by weight hydroxyl are thoroughly blended with 134.8 grams of N-vinyl-pyrrolidone.

Example 3

Using the same procedure as in Example 2, 180 grams of microTeflon powder (Zonyl MP1100 sold by Dupont) are throughly blended with 270 grams of N-vinyl-pyrrolidone.

Example 4

Using the procedure of Example 2 and a one gallon pail, 180 grams of a terpolymer of 81% vinyl chloride, 17% vinyl acetate and 2% maleic anhydride (Union Carbide VMCA) are thoroughly blended in 420 grams of methyl isobutyl ketone.

Example 5

The resulting blends from Example 2 and Example 3 are added to the resulting blend of Example 4 and mixed thoroughly.

Example 6

Using the procedure of Example 2, except a one gallon pail is used, the following ingredients are thoroughly blended: (1) 2500 grams of a UV curable polyurethane acrylate known by the trade name of Raycron UV 400 (supplied by PPG Industries, Inc. (Oak Creek, Wis.); (2) 360 grams of acrylated melamine resin in tripropylene glycol diacrylate (SantoLink AM-129—supplied by Monsanto Company); 540 grams of silica gel (Everymatte UV640— Shamrock Technologies) and 180 grams of a mixed ether and butylated Melamine resin (from Cytec Industries).

Example 7

Using the procedure of Example 2, except a one gallon pail is used, the following ingredients are thoroughly blended: (1) 2500 grams of a UV curable polyurethane acrylate known by the trade name of Raycron UV 400 (supplied by PPG Industries, Inc (Oak Creek, Wis.); (2) 540 grams of a mixture of polytetrafluoroethylene and polyethylene having a particle size of 18 microns (SuperTaber 5509-SP5—Shamrock Technologies, Inc.).

Example 8

Using a Bridgeport milling machine, a base mix is prepared containing 9,404 grams of a UV curable polyurethane acrylate known by the trade name of Raycron UV 400 (supplied by PPG Industries, Inc (Oak Creek, Wis.) and 540 grams of aluminum trihydrate (ATH-632-SH1—J. M. Huber Corp.) having a particle size range of about 3–5$\mu$.

Example 9

Using a Bridgeport milling machine, the base mix of Example 8, is thoroughly blended and mixed for about 30 minutes with the blends of Examples 5, 6 and 7.

Example 10

To the resulting blend prepared in Example 9, there is added 5% by weight of the total mixture of Lovel HSF (Hydroxylated Silicon Dioxide). The viscosity of the resulting mix is measured and adjusted to between 900–12,200 cp.

Example 11

Coating compositions were prepared as shown above containing the Raycron UV 400 component and different amounts of alumina trihydrate (ATH) of different sizes were prepared and tested for abrasion resistance. The results of those experiments are summarized in Table II.

TABLE II

| ABRASION TESTS FOR COMPOSITIONS CONTAINING ATH | | |
|---|---|---|
| WT % ATH | PARTICLE SIZE - 1$\mu$ WT. LOSS $10^{-5}$ g/cycle | PARTICLE SIZE 3–5$\mu$ WT. LOSS $10^{-5}$ g/cycle |
| 0 | 4.4 | 4.4 |
| 1 | 3.8 | 3.1 |
| 2 | 3.6 | 3.1 |
| 3 | 3.8 | 2.9 |
| 4 | 4.3 | 3.1 |
| 5 | 4.4 | 2.8 |
| 6 | 4.4 | 3.9 |
| 7 | 4.3 | |
| 8 | 4.7 | |
| 9 | 4.4 | |
| 10 | 5.6 | |

Example 12

Compositions containing the acrylated urethane Raycron UV 400 and filler particles of a mixture of polytetrafluoroethylene and polyethylene (SuperTaber identified above) with particle sizes of 18 and 5 microns were evaluated and the results are summarized in Table III.

TABLE III

| EFFECT OF SUPERTABER MATERIAL ON ABRASION | | |
|---|---|---|
| WT % ADDITIVE | PARTICLE SIZE - 18$\mu$ WT. LOSS $10^{-5}$ g/cycle | PARTICLE SIZE 5$\mu$ WT. LOSS $10^{-5}$ g/cycle |
| 1 | 2.8 | 2.9 |
| 2 | 5.3–2.7 | 2.8 |
| 3 | 2.9–2.4 | 2.1 |

The following Examples summarized in Table IV illustrate the effect of additives on the performance of the polyurethane coatings of the present invention.

| Example | 3% ATH | 3% Taber | 2% 129 | 3% EUV640 | 05% CAB | 1% Cymel 1135 | 1% VMCA | 1% Zalon | Wt Loss $10^{-5}$ g/cycl2 |
|---|---|---|---|---|---|---|---|---|---|
| 13 | x | x | | | | | | | 1.75 |
| 14 | x | x | x | | | | | | 1.92 |
| 15 | x | x | | x | | | | | 1.70 |
| 16 | x | x | x | x | | | | | 1.55 |
| 17 | x | x | | | x | | | | 1.72 |
| 18 | x | x | x | | x | | | | 1.80 |

-continued

| Example | 3% ATH | 3% Taber | 2% 129 | 3% EUV640 | 05% CAB | 1% Cymel 1135 | 1% VMCA | 1% Zalon | Wt Loss $10^{-5}$ g/cycl2 |
|---|---|---|---|---|---|---|---|---|---|
| 19 | x | x |   |   | x |   |   |   | 1.67 |
| 20 | x | x | x | x | x |   |   |   | 1.54 |
| 21 | x | x | x | x |   |   |   | x | 1.20 |
| 22 | x | x | x | x |   | x |   |   | 1.45 |
| 23 | x | x | x | x |   |   | x | x | 1.18 |
| 24 | x | x | x | x | x |   |   | x | 1.10 |
| 25 | x | x | x | x | x | x |   |   | 1.29 |
| 26 | x | x | x | x | x |   | x |   | 1.28 |
| 27 | x | x | x | x | x |   |   | x | 1.48 |
| 28 | x | x | x | x | x | x | x |   | 1.77 |
| 29 | x | x | x | x | x | x | x | x | 1.84 |

It will be apparent from the foregoing that many other variations and modifications may be made regarding the hydrophobic polyester resins described herein, without departing substantially from the essential features and concepts of the present invention. Accordingly, it should be clearly understood that the forms of the inventions described herein are exemplary only and are not intended as limitations on the scope of the present invention as defined in the appended claims.

What is claimed is:

1. A radiation curable coating composition comprising:

(a) 70% to 98% by weight of an oligomer of the formula

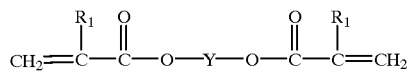

wherein $R_1$ is hydrogen or methyl; and Y is a divalent urethane residue;

(b) 2% to 30% by weight of fine particles of a filler blend capable of imparting abrasion resistance, said filler blend comprising a mixture of inorganic and organic particles, wherein said inorganic particles have an average particle size in the range of 1–20 microns and wherein said organic particles have an average particle size in the range of 1–20 microns;

(c) optionally a reactive diluent; and (d) a synthetic resin which is a terpolymer of vinyl chloride, vinyl acetate and maleic acid.

2. A radiation curable coating composition comprising:

(a) 70% to 98% by weight of an oligomer of the formula

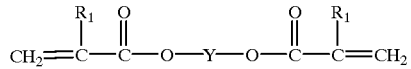

wherein $R_1$ is hydrogen or methyl; and Y is a divalent urethane residue;

(b) 2% to 30% by weight of fine particles of a filler blend capable of imparting abrasion resistance, said filler blend comprising a mixture of inorganic and organic particles, wherein said inorganic particles have an average particle size in the range of 1–20 microns and wherein said organic particles have an average particle size in the range of 1–20 microns;

(c) optionally a reactive diluent; and (d) a synthetic resin which is cellulose acetate butyrate.

3. A radiation curable coating composition comprising:

(a) 70% to 98% by weight of an oligomer of the formula

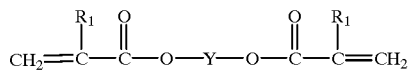

wherein $R_1$ is hydrogen or methyl; and Y is a divalent urethane residue;

(b) 2% to 30% by weight of fine particles of a filler blend capable of imparting abrasion resistance, inorganic filler is alumina trihydrate having a particle size in the range of 3–5 microns and said organic filler is a blend of polytetrafluoroethylene and polyethylene having a particle size of 1–20 microns;

(c) optionally a reactive diluent; and (d) optionally a synthetic resin.

4. A method of imparting abrasion resistance to wood floorings, which method comprises applying to said floorings a radiation curable coating composition comprising:

(a) 70% to 98% by weight of an oligomer of the formula

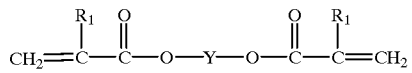

wherein $R_1$ is hydrogen or methyl; and Y is a divalent urethane residue;

(b) 2% to 30% by weight of fine particles of a filler blend capable of imparting abrasion resistance, said filler blend comprising a mixture of inorganic and organic particles, wherein said inorganic filler is alumina trihydrate having a particle size in the range of 3–5 microns and said organic filler is a blend of polytetrafluoroethylene and polyethylene having a particle size of 1–20 microns;

(c) optionally a reactive diluent; and (d) optionally a synthetic resin.

5. A method of imparting abrasion resistance to wood floorings, which method comprises applying to said floorings a radiation curable coating composition comprising:

a) 70% to 98% by weight of an oligomer of the formula

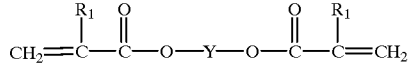

wherein $R_1$ is hydrogen or methyl; and Y is a divalent urethane residue;

(b) 2% to 30% by weight of fine particles of a filler blend capable of imparting abrasion resistance, said filler blend comprising a mixture of inorganic and organic particles, wherein said inorganic particles have an average particle size in the range of 1–20 microns and wherein said organic particles have an average particle size in the range of 1–20 microns;

(c) optionally a reactive diluent; and (d) additional synthetic resin which is cellulose acetate butyrate.

* * * * *